(12) United States Patent
Colakoglu

(10) Patent No.: US 10,325,571 B2
(45) Date of Patent: Jun. 18, 2019

(54) DATA COMMUNICATION METHOD VIA TOUCH SURFACE

(71) Applicant: Osman Colakoglu, Istanbul (TR)

(72) Inventor: Osman Colakoglu, Istanbul (TR)

( * ) Notice: Subject to any disclaimer, the term of this patent is extended or adjusted under 35 U.S.C. 154(b) by 0 days.

(21) Appl. No.: 15/915,612

(22) Filed: Mar. 8, 2018

(65) Prior Publication Data

US 2018/0197506 A1    Jul. 12, 2018

Related U.S. Application Data

(63) Continuation-in-part of application No. 14/122,053, filed as application No. PCT/TR2012/000077 on May 24, 2012, now Pat. No. 9,939,886.

(30) Foreign Application Priority Data

May 24, 2011    (TR) .................. 2011/05036

(51) Int. Cl.
| | | |
|---|---|---|
| *G06F 3/044* | (2006.01) | |
| *G09G 5/12* | (2006.01) | |
| *H04B 10/114* | (2013.01) | |
| *H04W 4/02* | (2018.01) | |
| *H04L 29/06* | (2006.01) | |
| *G06F 3/041* | (2006.01) | |
| *G06F 3/14* | (2006.01) | |
| *G06F 3/147* | (2006.01) | |

(52) U.S. Cl.
CPC .............. *G09G 5/12* (2013.01); *G06F 3/044* (2013.01); *G06F 3/0416* (2013.01); *G06F 3/147* (2013.01); *G06F 3/1454* (2013.01); *H04B 10/1143* (2013.01); *H04L 65/4015* (2013.01); *H04W 4/02* (2013.01); *G06F 2203/04104* (2013.01); *G09G 2370/16* (2013.01); *G09G 2370/18* (2013.01)

(58) Field of Classification Search
CPC ..... G06F 3/002; G06F 3/044; H04N 1/00129; H04N 1/00347; H04N 2201/006; H04N 2201/0087; H04N 2201/0089; H04N 2201/0048; H04N 2201/0053; H04N 2201/0084
See application file for complete search history.

(56) References Cited

U.S. PATENT DOCUMENTS

2008/0253766 A1 * 10/2008 Yu ..................... H04B 10/1143
398/41
2009/0251339 A1 * 10/2009 Naruse ................ G06F 1/1626
341/33

(Continued)

FOREIGN PATENT DOCUMENTS

| EP | 1237333 A1 | 9/2002 | |
|---|---|---|---|
| EP | 2846508 A1 * | 3/2015 | ........... H04L 9/3215 |

(Continued)

*Primary Examiner* — Bryan Earles
(74) *Attorney, Agent, or Firm* — Egbert, McDaniel & Swartz, PLLC

(57) ABSTRACT

A data communication method enabling wireless sharing of files or data between electronic devices that can store information and/or generate information by means of touch surface (capacitive or multi-touch), display units (LCD, led, etc.), photo sensor and frame having negative electrical conductivity.

6 Claims, 3 Drawing Sheets

(56) References Cited

U.S. PATENT DOCUMENTS

| | | | |
|---|---|---|---|
| 2010/0267421 A1* | 10/2010 | Rofougaran | G06F 3/044 455/566 |
| 2011/0069951 A1* | 3/2011 | Son | H04B 10/1149 398/17 |
| 2011/0284632 A1 | 11/2011 | Mullen | |
| 2013/0231046 A1* | 9/2013 | Pope | G06K 9/00013 455/41.1 |
| 2015/0195007 A1* | 7/2015 | He | H04B 5/0012 455/41.1 |
| 2015/0236754 A1* | 8/2015 | Hofmann | G06K 7/081 455/41.1 |

FOREIGN PATENT DOCUMENTS

| | | |
|---|---|---|
| JP | 2009044532 A | 2/2009 |
| WO | 2007017848 A2 | 2/2007 |

* cited by examiner

DATA COMMUNICATION METHOD VIA TOUCH SURFACE

CROSS-REFERENCE TO RELATED APPLICATIONS

The present application is a continuation-in-part of the U.S. patent application Ser. No. 14/122,053, filed on Nov. 25, 2013, and entitled "Data Communication Method via Touch Surface", presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to a method enabling wireless sharing of files or data via touch surface between electronic devices that can store information and/or generate information.

The present invention especially relates to a data transfer method after the connection of the electronic devices that can store information and/or generate information wherein one of the devices can transfer the data to the image display of the other device. For instance, a mobile device placed on a table computer can determine the direction of the graphical display, which has to be transmitted according to its position, with a digital compass sensor on the mobile device.

2. Description of Related Art Including Information Disclosed Under 37 CFR 1.97 and 37 CFR 1.98

There are two methods, wired and wireless, of data sharing between electronic devices. In the data transmission via cables, there are adverse circumstances such as the possibility of the cables being lost; not available to the user; not compatible with the device such as computers, etc. to which the data will be transmitted. Another problem is the failure to establish data transmission when the cable is deformed.

Another problem encountered in the current state of the art is that there are risks such as the computer not recognizing the external apparatus when external devices such as flash memory, memory card, etc. are used.

There is the breakdown possibility of the plug-in-out apparatus (cable, flash memory, memory card, etc.) during the plugging in and out thereof to and from the device such as computers, etc. to which the data will be communicated. Similarly, corresponding parts of the cameras, mobile phones, etc. to which the data will be transmitted can be damaged. Moreover, there is a high risk of experiencing data loss in the memory cards or flash memories during the wrong use of plug-in-out apparatus.

Location of the relevant memory card cannot be known to all of the users when using media tools such as cameras, mobile phones, etc. and there is a risk of loss while plugging and removing the memory card, therefore, there is a risk of data loss.

During wireless transmissions (such as the data transfer which will be carried out only with Bluetooth) there is a risk of sending the data to a different user.

Bluetooth data sharing method used in the current state of the art can also be employed. However, this method is manual. Primarily, devices should be manually introduced to each other for communication between them. Data communication by means of this method takes longer and thus is more difficult. This is because the user must introduce the devices to each other and find the location of files on the computer.

Users may have difficulty in locating the relevant folder in the operating system if the computer doesn't automatically show the removable devices on the screen during the plugging in of these devices. For instance, let's say that a user goes to a printing centre and the employees of the centre use table computers. The user wants birthday photos taken at their home to be printed. In this case, the duration for the activation of the Bluetooth feature of the camera and introduction of this camera to the computer is 5 to 10 minutes for a person familiar with these operations. This situation will cause the job of the user to take longer or not preferring data import from the cameras.

In the prior art, the location of the mobile device is automatically determined according to the position where signal sends. But in order to determine the direction of the mobile device according to the table computer, the mobile device and the table computer have to include compass sensors. Otherwise, the screen image of the other device placed on the screen will be independent of the device. The user will have to set this direction by realizing a second action.

In conclusion, an improvement in the relevant technical field is rendered necessary due to the negative aspects mentioned above and insufficiency of the current solutions.

OBJECT OF THE INVENTION

The invention is developed by being inspired from existing conditions and seeks to solve the above mentioned drawbacks.

The object of the present invention is to provide that the user will be able to perform quick operations while using the devices and to reconfigure the direction of the graphical interface of the second device on the screen according to the motion of the device.

The object of the present invention is to enable quick wireless sharing of files or data between electronic devices that can store information and/or generate information.

Another object of the present invention is to eliminate the need for cables used in the current state of the art thanks to the wireless connection of the electronic devices with each other.

Another object of the present invention is to eliminate cable incompatibility between different models of electronic devices as cable is not required for connection.

Another object of the present invention is to prevent any deformation of the parts of removable devices as cable is not required for connection.

Another object of the present invention is to provide a means for users of all ages thanks to the easy use thereof.

Another object of the present invention is to enable even the users who do not know a foreign language to send data thanks to the simple transfer mode provided.

Another object of the present invention is to eliminate the problem of waste of time thanks to the devices quickly establishing communication with each other.

Another object of the present invention is to facilitate data communication of increasingly used electronic devices of today such as multi-touch screen (capacitive screen) computers and cameras, mobile phones, etc. with each other, making this method functional.

Another object of the present invention is to facilitate transfer of photos from the camera or address book, messages and e-mails from the mobile phone to the computer (mainframe) or another electronic device by placing the device such as camera or mobile phone on the touch surface of the multi-touch screen computer (mainframe).

Another object of the invention, in the case of multiple cameras or mobile phones, etc. that can record data being placed on the mainframe screen, is to enable the mainframe displaying the data types (photos, videos, etc.) contained within these devices right next to the device by detecting the position thereof on the screen and type of data for each device.

BRIEF SUMMARY OF THE INVENTION

The present invention for fulfilling the above-described objects is a method of data communication via a touch surface such as to enable wireless data communication between a first device and a second device, the method comprising:
  turning on the first device and the second device, the first device capable of data generation and/or data storage, the second device capable of data generation or data storage, said second device is electrically connected with a capacitive multi-touch panel with a capacitive multi-touch surface;
  after performing the data transmission that the user wishes to perform, the user disconnects the connection of the first device with the second device;
wherein the method further comprises
  turning on the first device and sending the signal to the conductive frame;
  placing the first device on the capacitive multi-touch surface connected with the second device;
  sending the signals defining the identification and position information of the first device on the capacitive multi-touch surface by the conductive frame;
  receiving the signals sent by the conductive frame on the capacitive multi-touch surface;
  blanking of the image blanking unit located within the capacitive multi-touch panel, corresponding to the bottom of the conductive frame;
  sending of the information from the second device to the first device, containing the confirmation that the identity and location of the first device is received and it is ready to receive data, by means of light signals through the data transfer units;
  identification by the first device through converting the light signals emitted by the data transfer units into data thereof that the second device recognized it and is ready to receive data;
  transferring the data by using capacitive multi-touch panel from the first device to the second device or from the second device to the first device.

In a preferred embodiment of the present invention, the data is transferred by using capacitive multi-touch panel from the first device to the second device by electric signals or from the second device to the first device by the light signals.

In a preferred embodiment of the present invention, the data is transferred by using capacitive multi-touch panel from the first device to the second device or from the second device to the first device by the radio frequency signals.

In a preferred embodiment of the present invention, identification is provided by the first device through converting the light signals emitted by the data transfer units into data by means of a photo sensor thereof that the second device recognized it and is ready to receive data.

The invention further includes the above-described method, further including the steps of:
  turning on the first device and the second device;
  placing the first device on the capacitive multi-touch surface connected with the second device;
  waiting for said first and second devices to shake hands with each other and connecting to each other with data signals;
  determining of the location of the first device on the capacitive panel relative to the signal coming from the first device;
  mirroring the main graphical interface of the second device to the image display, wherein the main graphical interface is the home page of the first device;
  determining the direction of the graphical interface in accordance with the position of the first device with the compass sensors located on both devices according to the position on the capacitive multi-touch surface.

The invention further includes the above-described method, further comprising:
  changing the position of the first device having a compass sensor;
  determining the location of the first device by the second device with the data signals coming from the first device which is replaced;
  remirroring the graphical interface of the first device after determining the position of the first device on the capacitive multi-touch surface;
  rearranging the direction of the graphical interface of the first device according to the position of the first device.

The structural and the characteristic features and all advantages of the invention will be understood more clearly with the detailed description written by referring to the following figures and therefore, the evaluation needs to be done by taking these figures and the detailed description into consideration.

DESCRIPTION OF REFERENCE NUMERALS

Figure 1:
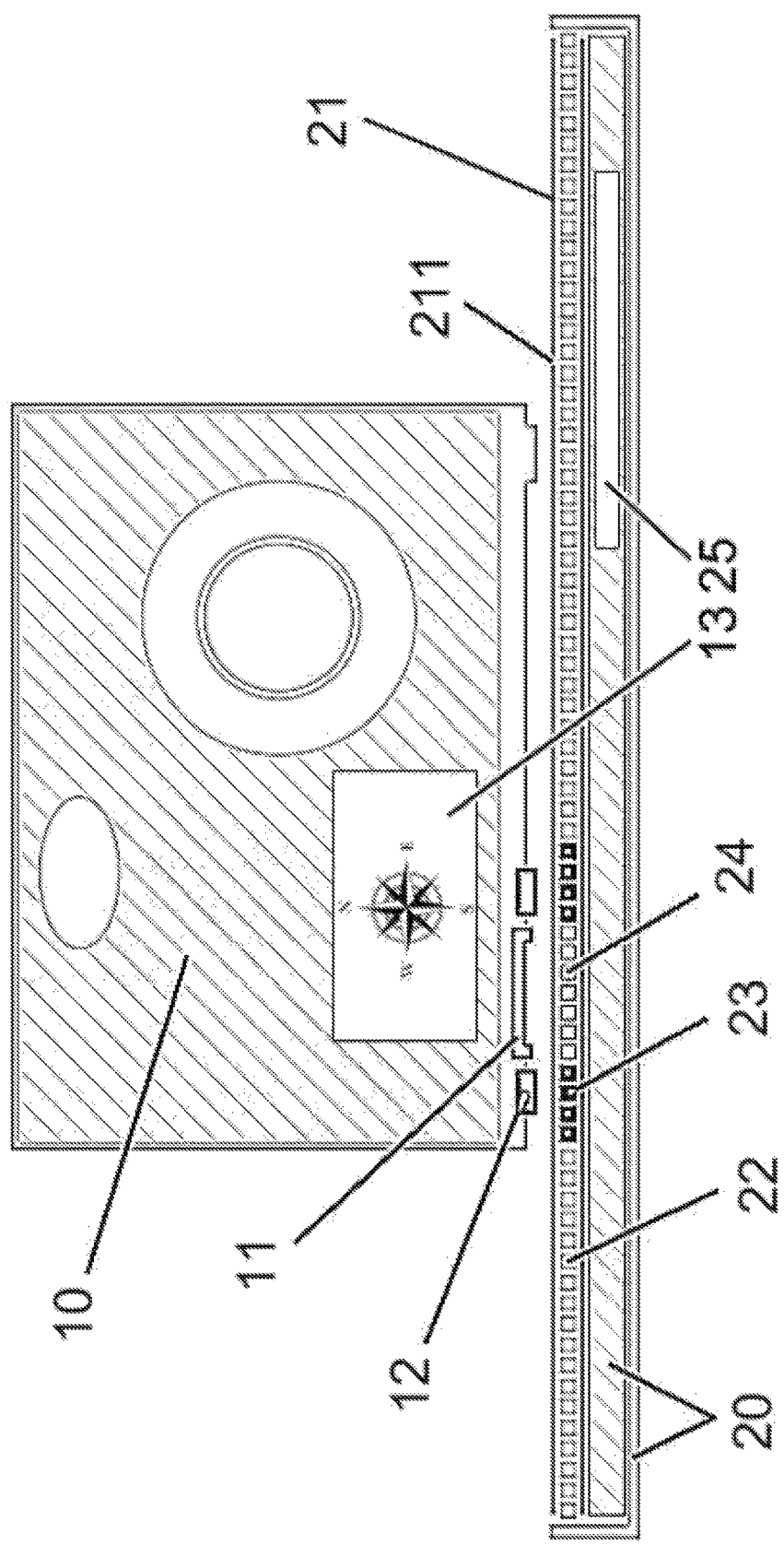
FIG. 1 is a representational view of the elements used in the data communication method via touch surface according to the invention.
Figure 2:
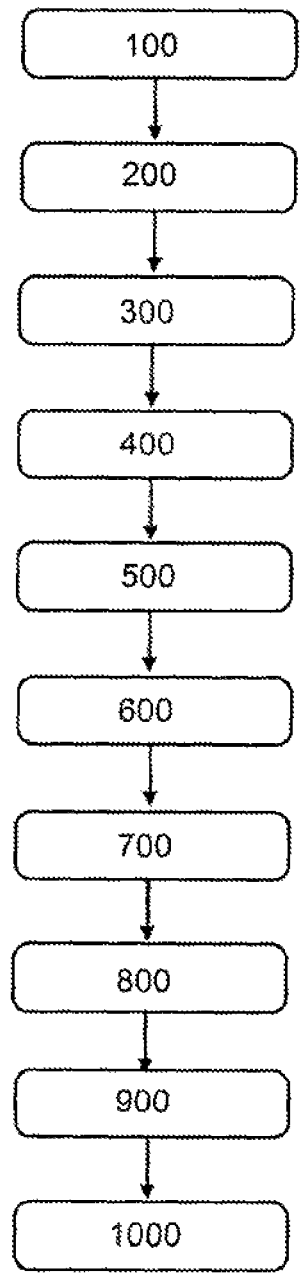
FIG. 2 is a flow diagram showing the process steps of the data communication method via touch surface according to the invention.

10. First device
11. Photo sensor
12. Conductive frame
13. Compass sensor of first device
20. Second device
21. Capacitive multi-touch panel
25. Compass sensor of second device
211. Capacitive multi-touch surface
22. Image forming units
23. Image blanking units
24 Data transfer units

DESCRIPTION OF THE PROCESS STEPS

100. Turning the first device (10) and the second device (20) on
200. Turning the first device (10) on for sending commands triggering the second device (20) as negative electrical signals through conductive frame part (12)
300. Placing the first device (10) on the capacitive multi-touch surface (211) connected with the second device (20)
400. Sending the signals enabling the detection of the identity and position information of the first device (10) on the multi-touch panel (21) to the second device (20) through conductive frame (12) over capacitive multi-touch surface (211)
500. Reception of the signals sent over capacitive multi-touch surface (211) through the conductive frame (12) by the second device (20)
600. Blanking of the corresponding area of the second device (20) located below the conductive frame (12), for image blanking unit (23) located below capacitive multi-touch surface (211) sending signal
700. Sending of the information from the second device (20) to the first device (10), containing the identity information of the second device (20) and the confirmation that the identity and location of the first device (10) is received and it is ready to receive data, by means of light signals through switching the data transfer units (24) corresponding to the middle of image blanking units (23) on and off
800. Identification by the first device (10) through converting the light signals emitted by the data transfer units (24) into data by means of photo sensor (11) thereof that the second device (20) recognized it and is ready to receive data
900. Transferring the data by using capacitive multi-touch panel (21) from the first device (10) to the second device (20) or from the second device (20) to the first device (10) depending on the preference of user
1000. Disconnection of the first device (10) from the second device (20) after the user performs the desired data transfer Scaling of drawings is not absolutely required and details, which are not needed for understanding the present invention, can be neglected. Furthermore, elements, which are at least substantially identical or have at least substantially identical functions, are indicated with the same number.

DETAILED DESCRIPTION OF THE INVENTION

In this detailed description, preferred process steps of the data communication via multi-touch surface according to the invention are explained only for a better understanding of the subject matter.

Data communication according to the present invention using multi-touch surface comprises the following: first storage device (10); photo sensor (11); conductive frame (12); and second storage device (20) on which multi-touch panel (21) comprising multi-touch surface (211) is provided.

Capacitive multi-touch panel (21) is provided on the second device (20) and connected electrically to the second device (20). Here the term multi refers to multi-touch panel (21) being sensitive to a plurality of electronic devices. Capacitive multi-touch panel (21) provides data input to any electronic device by means of touching operation, wherein it comprises capacitive touch surface (211) preferably allowing usage by the finger. Said panel (21) can be any other type of panel having the multi-touch feature and being sensitive to negative or positive electricity.

The image on the capacitive multi-touch panel (21) is provided by means of the image forming unit (22), image blanking unit (23) and data transfer units (24), all of which are located just below the capacitive multi-touch surface (211) and preferably composed of LEDs. Said units (22, 23, 24) are preferably LED, wherein the image on the capacitive multi-touch panel (21) can also be provided by means of a projector, led, a plasma or LCD screen.

The first device (10) and the second device (20) are characterized in that both can generate and store data and at least one of the two (10, 20) has a capacitive multi-touch surface (211). Therefore, the first device (10) and the second device (20) may also be a mouse or keyboard, as well as telephone, a tablet PC, camera or a hard disk such that at least one of the two said devices to be provided with data communication comprise capacitive multi-touch surface (211). In this detailed description operations performed will be described with the camera (10) as the first device (10) and the table-shaped computer (20) as the second device (20).

Conductive frame (12) is made of metallic material and surrounds the photo sensor (11). Conductive frame (12) is used to transmit data from the camera (10) to the table-shaped computer (20) by means of negative electricity. Photo sensor (11) is used to measure light intensity of the data transfer units (24) provided in the table-shaped computer (20).

Data communication method via multi-touch surface according to the invention takes place as follows. First, the user turns the camera (10) and the table-shaped computer (20) on by means of pressing on the on and off buttons provided thereon (100). When the first device (10) is turned on it sends signal to the conductive frame (12). Then, the user places the camera (10) on the touch panel (21) such that the conductive metal frame (12) stays on the capacitive multi-touch surface (211) of the capacitive multi-touch panel (21) (300). The camera (10) starts to send the signals, required for its introduction to the table-shaped computer (20), to the touch panel (21) through conductive frame (12) and using negative electricity (400). The computer (20) starts to receive said signals by means of the capacitive multi-touch panel (21) and acquires information comprising identity of the camera (10) and location thereof on the capacitive multi-touch surface (211) (500). Now, the information regarding the camera (10) is received by the computer (20). In this case, the computer (20) should start to communicate with the camera (10). Thus, the computer (20) blanks the corresponding area below the conductive metal frame (12) for the photo sensor (11) provided in the camera (10) by preventing light emission of the image blanking units (23) provided in the touch panel (21) (600). With this process, the computer (20) starts to send signal to the photo sensor (11) by means of the data transfer units (24) provided in the middle of the blanked area for transferring data to the camera (10) (700). These sent signals comprise information confirming that relevant information about the camera (10) is received and the computer (20) is ready to receive data. At this point, actually, the difficult and time consuming introduction process, i.e. introduction of the camera (10) to the table-shaped computer (20) is obtained. Now, at this moment, the user may choose a method for data communication between the camera (10) and the table-shaped computer (20) or proceed with the already chosen method. After the introduction process of the devices (10, 20) to each other, the user may maintain the connection between the camera (10) and the table-shaped computer (20) by means of light and electrical signals as in the introduction process or may prefer to carry out communication by means of radio frequency. In the case that the user prefers to perform the communication via radio frequency, he or she may choose communication via Bluetooth (wireless connection for short distances) or Wi-Fi (wireless connection). Then, the user can perform desired operations via multi-touch surface (211) or a button or buttons provided on the camera (10) (900).

User requests such as sending photos, videos, etc., sending and receiving signal by means of light signals take place as follows: sending of the signal from the camera (10) to the table computer (20) proceed from the conductive metal frame (12) towards the capacitive multi-touch surface (211) while sending of the signal from the table computer (20) to the camera (10) proceed from the data transfer units (24) towards the photo sensor (11).

Upon completion of the data sending and receiving processes, the user performs disconnection process of the camera (10) from the computer (20) (1000). This process can be carried out by pressing the on off buttons of either the camera (10) or the table computer (20) or by removing the camera (10) from the capacitive multi-touch surface (211) (1000).

Figure 3:
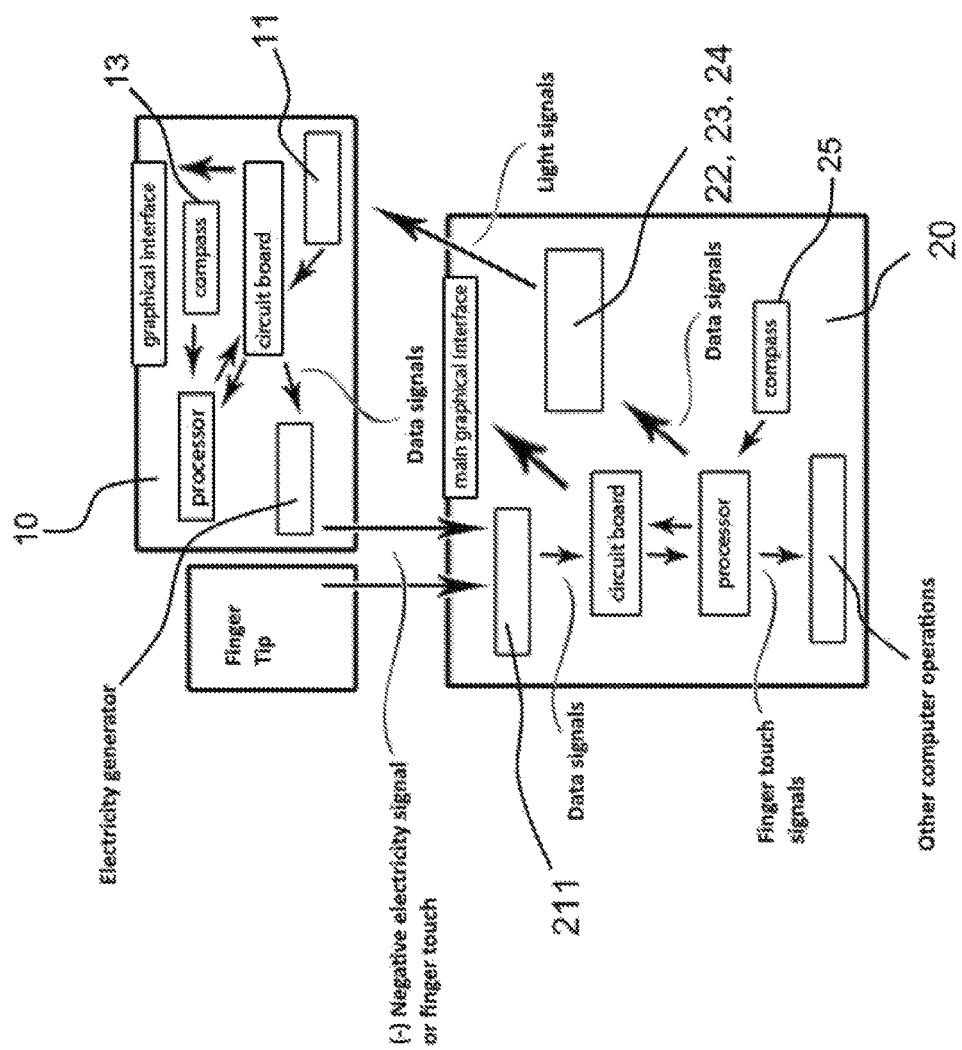
FIG. 3 is a schematic view showing the data communication between the first device and the second device of the data communication method via touch surface according to the invention.

In FIG. 3, a schematic view showing some process steps of the data communication method via touch surface according to the invention and data communication between the first device (10) and the second device (20) is given. First, the first and the second device (10, 20) are turned on. Then, energy is given to the conductive frame (12) by means of the electricity generator of the first device (10). As shown in FIG. 3, the first electronic device (10) is placed on the capacitive multi-touch surface (211). The first device (10) sends data signals to the second device (20) through the conductive frame (12) by means of negative electrical signals thanks to the capacitive feature of the capacitive multi-touch surface (211). Said data signals is processed within the processor of the second device (20) and said processor generates data comprising information confirming that the second device (20) recognized the first device and it is ready to receive data. Data transfer units (24) send this information to the photo sensor (11) by means of light signals. Data signals received by the photo sensor (11) are sent to the processor of the first device (10). Processor receives these data signals and generates the information that it is now ready to send data. After these operations, content of the first device (10) is displayed on the capacitive multi-touch surface (211). List of data types (photo, video, etc.) contained within the first device (10) is displayed right next to the said device.

Then, the user moves their finger on the capacitive surface (211) for arranging the content displayed on the capacitive multi-touch surface (211). Capacitive surface (211) detects touching of the finger and the processor of the second device (20) performs computer operations according to the requests of the user.

The most important point in the data communication via capacitive multi-touch surface (211) is that the camera (10) is introduced to the table computer (20) in an easy manner and the data desired to be sent from the camera (10) to the table computer (20) is shown with respect to the position of the camera (10) on the table computer (20). For instance, let's say that a table computer (20) is available and 2 cameras (10) are placed on table computer (20). By this way, content for each camera (10) will be shown around thereof. This, in turn, will provide an easy way to find and manage the photos and videos contained the cameras (10) on the capacitive multi-touch surface (211).

The following example can be given for an application of the data communication method via touch surface. In the printing centres, there are table computers (20) comprising touch panels (21). The user places the camera (10) on the table computer (20). The camera (10) and the computer (20) communicate quickly with each other thanks to the data communication mentioned above. Then, the data is transferred to the table computer (20) through this method taking place by means of light signals or radio frequency signals initiated by this method.

In this detailed description, the additional process steps are further described for better understanding of the subject, with regard to the method of reconfiguring the graphical interface between devices.

It is imperative that the compass sensor is present on the table computer and on the mobile device. It is necessary for the user to view the data on the device regularly and to rotate the graphic screen towards the user without performing a second action on the user at the location change. This will allow faster processing and better interaction with the user. Also, if multiple mobile devices are placed on the touch screen of the desktop computer, it will prevent the content from intermingling.

First of all, the second device, namely table computer, has to find its own direction. The compass sensor 25 will find out how many degrees it is facing north. The first device, namely mobile device, will make same action. When placed on the touch screen display, the table computer and the mobile device will determine their orientation (direction).

The position and orientation of the graphical interface will be rearranged according to the position and direction of the mobile devices when multiple mobile devices are located on the table computer.

Moving the graphical interface according to the status of the mobile device will make it easier for the user. Positioning each mobile device according to its own situation will prevent confusion for multiple users.

For example, the graphical interface can be established in a certain direction of the mobile device. The user will remember when the mobile device is used again, where the graphical interface should be created on the mobile device. In addition, the user will be able to save the position and orientation as data to the mobile device for later use.

For initial use, the mobile device manufacturer can determine the position and orientation. Thus, the user will not have lived in confusion the first time. It will also prevent the graphical interface from remaining invisible under the device.

The user must place the mobile device on the touch pad of the table computer. The table computer is already ready to receive the signal in this case. The data signals from the mobile device begin to be sent to the table computer's touch screen. The table computer identifies the identity and location of the mobile device. After the handshake protocols, the two devices are connected. Then, the graphical interface starts to be created according to the characteristics of the mobile device. And the compass sensors on both devices will determine the direction of the devices at the same time. The orientation of the created graphical interface will be adjusted according to the state of the mobile device and the table computer.

Only the use of the compass sensor on the mobile device will be sufficient in part.

The location of the mobile device is checked regularly. When the devices are repositioned, the mobile device's position will be found again and the compass sensor function will be automatically re-enabled.

I claim:

1. A method of data communication via a touch surface such as to enable wireless data communication between a first device and a second device, the method comprising:
   turning on the first device and the second device, the first device capable of data generation and/or data storage, the second device capable of data generation or data storage, said second device is electrically connected with a capacitive multi-touch panel with a capacitive multi-touch surface;
   after performing a data transmission that a user wishes to perform, the user disconnects the first device from the second device;
   wherein the method further comprises
   turning on the first device and sending a signal to a conductive frame of said first device;
   placing the first device on the capacitive multi-touch surface connected with the second device;
   sending signals defining identification and position information of the first device on the capacitive multi-touch surface by the conductive frame;
   receiving the signals defining identification and position of the first device sent by the conductive frame on the capacitive multi-touch surface;
   blanking of an image blanking unit located within the capacitive multi-touch panel, corresponding to the bottom of the conductive frame;
   sending of the information from the second device to the first device, containing the confirmation that the identity and location of the first device is received and it is ready to receive data, by means of light signals through data transfer units;
   identification by the first device through converting the light signals emitted by the data transfer units into data thereof that the second device recognized it and is ready to receive data;
   transferring the data by using capacitive multi-touch panel from the first device to the second device or from the second device to the first device.

2. The method of claim 1 wherein the data is transferred by using capacitive multi-touch panel from the first device to the second device by electric signals or from the second device to the first device by the light signals.

3. The method of claim 1 wherein the data is transferred by using capacitive multi-touch panel from the first device to the second device or from the second device to the first device by radio frequency signals.

4. The method of claim 1 wherein identification is provided by the first device through converting the light signals emitted by the data transfer units into data by means of a photo sensor thereof that the second device recognized it and is ready to receive data.

5. The method of claim 1 wherein the method further comprises:
   turning on the first device and the second device;
   placing the first device on the capacitive multi-touch surface connected with the second device;
   waiting for said first and second devices to shake hands with each other and connecting to each other with data signals;
   determining of the location of the first device on the capacitive panel relative to the signal coming from the first device;
   mirroring a main graphical interface of the second device to the image display, wherein the main graphical interface displaying a graphical interface of the first device;
   determining the direction of the main graphical interface in accordance with the position of the first device with compass sensors located on both devices according to the position on the capacitive multi-touch surface.

6. The method of claim 1 wherein the method further comprises:
   changing the position of the first device having a compass sensor;
   determining the location of the first device by the second device with the data signals coming from the first device which is replaced;
   re-mirroring a graphical interface of the first device after determining the position of the first device on the capacitive multi-touch surface;
   rearranging the direction of the graphical interface of the first device according to the position of the first device.

* * * * *